(12) United States Patent
Hansen

(10) Patent No.: US 6,807,234 B2
(45) Date of Patent: Oct. 19, 2004

(54) METHOD AND APPARATUS FOR CONSTELLATION MAPPING AND BITLOADING IN MULTI-CARRIER TRANSCEIVERS, SUCH AS DMT-BASED DSL TRANSCEIVERS

(75) Inventor: Carl Christian Hansen, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 09/742,804

(22) Filed: Dec. 19, 2000

(65) Prior Publication Data

US 2002/0097791 A1 Jul. 25, 2002

(51) Int. Cl.[7] .............................................. H04L 27/00
(52) U.S. Cl. ...................... 375/259; 375/295; 370/525; 370/526
(58) Field of Search ................................. 375/259, 260, 375/295, 316, 349, 224, 227, 261, 222, 219, 225; 370/306, 252, 431, 522, 525, 526, 527

(56) References Cited

U.S. PATENT DOCUMENTS

| | | | | |
|---|---|---|---|---|
| 5,619,505 A | * | 4/1997 | Grube et al. ................ | 370/476 |
| 5,682,419 A | * | 10/1997 | Grube et al. ................ | 455/450 |
| 6,005,893 A | * | 12/1999 | Hyll .......................... | 375/260 |
| 6,072,779 A | * | 6/2000 | Tzannes et al. ............ | 370/252 |
| 6,134,273 A | * | 10/2000 | Wu et al. .................... | 375/261 |
| 6,608,832 B2 | * | 8/2003 | Forslow ..................... | 370/353 |
| 6,640,239 B1 | * | 10/2003 | Gidwani .................... | 709/203 |
| 2002/0172146 A1 | * | 11/2002 | Wu et al. .................... | 370/208 |

OTHER PUBLICATIONS

International Telecommunication Union—Telecommunication Standardization Sector, "Draft Recommendation: G.992.2–Splitterless Asymmetric Digital Subscriber Line (ADSL) Transceivers, " Jun./Jul. 1999.

* cited by examiner

Primary Examiner—Jean B. Corrielus
(74) Attorney, Agent, or Firm—Blakely, Sokoloff, Taylor & Zafman LLP

(57) ABSTRACT

A multi-carrier transceiver, such as a DMT-based ADSL transceiver, has separate processing paths for different information types, such as voice, data, video, etc. Each processing path can include separate scrambling, interleaving, bit loading or tone ordering, and constellation encoding. In this manner, specific bit loading or tone ordering can be performed for each of the different information types, such that transmission carriers are selected for optimal bit rates and error rates.

29 Claims, 2 Drawing Sheets

METHOD AND APPARATUS FOR CONSTELLATION MAPPING AND BITLOADING IN MULTI-CARRIER TRANSCEIVERS, SUCH AS DMT-BASED DSL TRANSCEIVERS

BACKGROUND OF THE INVENTION

1. Field of the Invention

The present invention relates generally to communications, and in particular but not exclusively, relates to constellation mapping and bit loading in multi-carrier transceivers.

2. Background Information

High-speed data communication paths are typically required in order to make high data rate services, such as video and Internet access, available to end users. Fiber optic communication paths are well suited for these high data rate services, but are not readily available in existing communication systems and are expensive to install. Therefore, asymmetric digital subscriber line (ADSL) technology has been developed to allow use of current telephone wiring connections (e.g., twisted-pair copper lines) for high data rate services.

ADSL systems typically use discrete multi-tone (DMT) techniques (e.g., a multi-carrier technique) that divide the available bandwidth of twisted-pair copper lines into multiple channels or "bins." With DMT, a plurality of frames of a data stream is broken down into data blocks. Each data block is allocated to multiple carrier channels. A carrier channel, in turn, can be represented as a vector whose magnitude and phase is based on the data that the carrier channel is carrying and on the amount of bits that the carrier channel can support (sometimes referred to as "bit loading" or "tone ordering"). The bit loading of the carrier channel is indicative of the number of constellation points (e.g., the number of magnitude and phase combinations for the vector). Thus, if the bit loading of a particular carrier channel is 2, then the number of constellation points is 4, with a constellation point in each quadrant representing the binary number 00, 01, 10, or 11 for example. This process of associating binary numbers to constellation points is sometimes referred to as "constellation encoding" or "constellation mapping."

Each of the carrier channel vectors may be used to produce a quadrature amplitude modulated (QAM) signal at a given frequency. The QAM signals are then summed to produce a time domain DMT "symbol" that is subsequently transmitted over the twisted-pair copper line. That is, each of the carriers that make up the DMT symbol contains a QAM signal. A DMT symbol is generated for each frame of the original data stream.

There are drawbacks, however, with the techniques described above. Current ADSL systems typically mix/multiplex voice, data, video, etc. in the same processing path, using the same constellation encoding and bit loading for these different types of information. Thus voice and data are handled/processed equally without distinguishing one from another. For example, aggressively bit loading so as to provide a constellation having many points produces a high bit rate but results in a high error rate. Conversely, conservatively bit loading so as to provide a constellation having fewer points produces a lower bit rate but results in a low error rate. While voice transmission is more tolerant of errors, data transmission is not. By treating voice and data equally in terms of bit loading, existing ADSL systems do not take such factors into account, thereby resulting in non-optimal performance of the system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus and method for constellation mapping and bit loading in a transceiver are described herein. In the following description, some specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides a transceiver having separate bit loading and constellation encoding for each processing path. In this manner, different information types, such as voice, data, video, etc., can be processed separately (e.g., bit-loaded or tone-ordered) to optimize transceiver performance.

Figure 1:
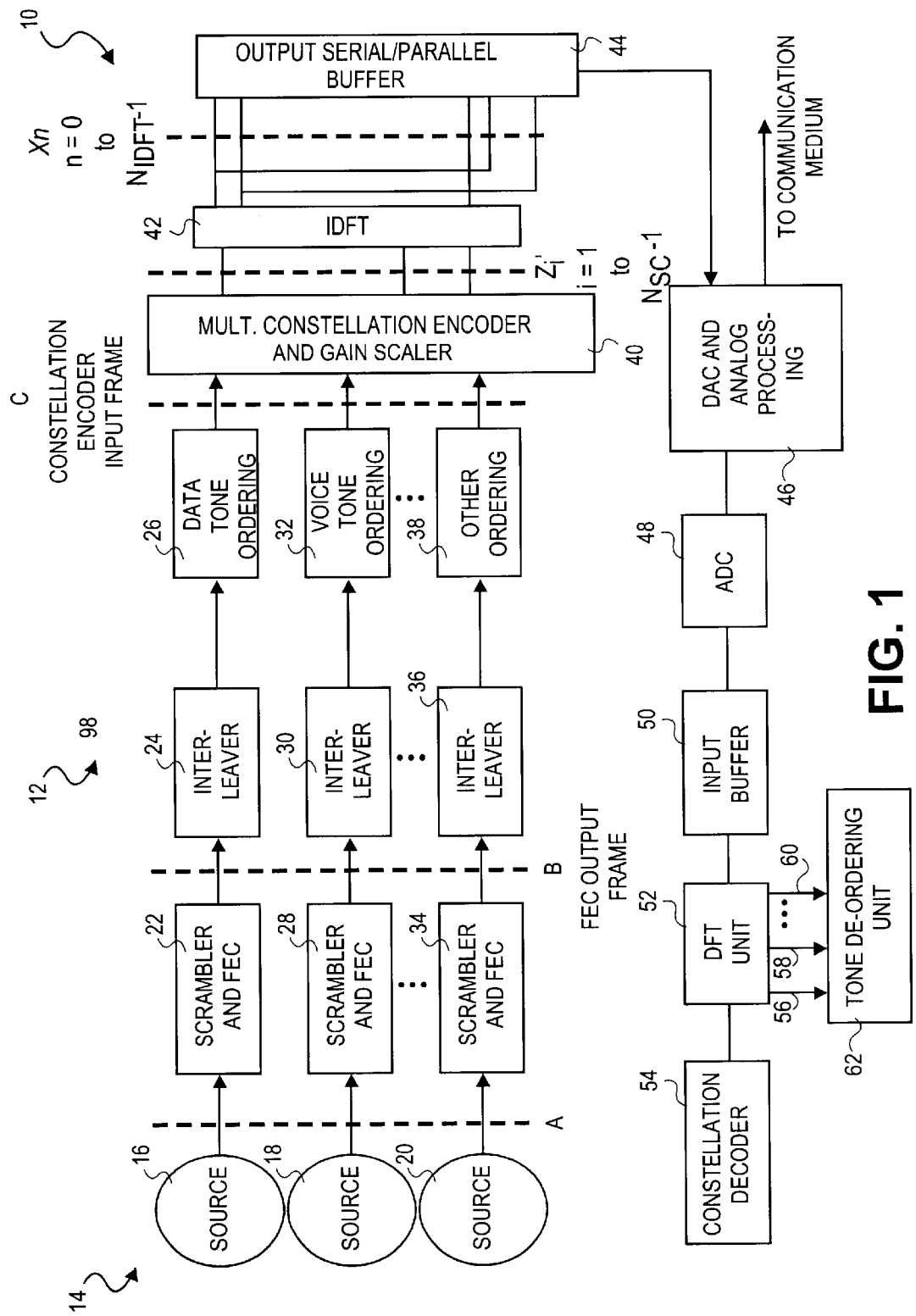
FIG. 1 is a block diagram of a transceiver according to an embodiment of the invention.

Referring first to FIG. 1, shown generally at 10 is a system according to one embodiment of the invention. The system 10 includes a transceiver 12, which in one embodiment comprises a DMT-based ADSL transceiver. For simplicity of explanation, operation of the system 10 will generally be described herein in the context of transmitting information in a transmit mode of operation. Where appropriate for illustrative purposes, operation of the system 10 or other system in the context of receiving information in a receive mode of operation is also described.

The system 10 includes a plurality of information sources 14 that provide information to be transmitted by the transceiver 12. For example, a source 16 can provide data, a source 18 can provide voice, and a source 20 can provide video, gaming information, or other types of information. In accordance with one embodiment of the invention, information provided by one or more of the sources 14 up to a reference point delineated as "A" can be in the form of asynchronous transfer mode (ATM) frames or cells, which are generated and sent towards the reference point A using known ATM techniques. In another embodiment, information from one or more of the sources 14 can be sent towards the reference point A using formats and techniques other than ATM.

The processing of the information from the sources 14 up to the reference point A can include operations such as cell delineation, bit timing and ordering, framing, and cyclic redundancy checks. It is understood that other operations may be performed, including the various operations that are known by those skilled in the art.

In accordance with one embodiment of the invention, separate processing paths are provided in the transceiver 12 for each of the different information types from the sources 14. For example, a processing path for data from the source 16 includes a scrambler and forward error correction (FEC) unit 22, an interleaver unit 24, and a data tone ordering unit 26. A processing path for voice from the source 18 includes a scrambler and FEC unit 28, and interleaver unit 30, and a voice tone ordering unit 32. Additional path(s) may be provided for processing information sent from the source 20, with the path(s) similarly having a scrambler and FEC unit 34, interleaver unit 36, and ordering unit 38. It is to be appreciated that in some embodiments, scrambler and FEC unit(s) and/or interleaver unit(s) need not be used.

According to one embodiment, a separate processing path is provided for each of the different information types sent from the sources 14. It is also possible to provide an embodiment that includes multiple processing paths for any given information type. For instance, two processing paths for video may be provided if there are two video sources that generate video information to be transmitted.

Binary streams can be scrambled and forward-error-corrected by the scrambler and FEC units 22, 28, 34 using suitable methods and techniques, such as those that are known in the art. For example, Reed-Solomon forward error correction may be used in one embodiment. Additional details of scrambling techniques and Reed-Solomon forward error correction can be found in International Telecommunication Union—Telecommunication Standardization Sector, "Draft Recommendation: G.992.2—Splitterless Asymmetric Digital Subscriber Line (ADSL) Transceivers," June/July 1999 (hereinafter referred to as the "G.992.2 Standards").

The scrambler and FEC units 22, 28, 34 output frames towards a reference point delineated as "B" in FIG. 1. According to one embodiment, the frames are generated at the reference point B at a nominal 4 kHz rate, with each frame containing K bytes.

Next in the processing paths are the interleaver units 24, 30, 36. In one embodiment, the interleaver units 24, 30, 36 can use convolutional interleaving to interleave Reed-Solomon codewords respectively provided from the scrambler and FEC units 22, 28, 34. An example of convolutional interleaving can be found in the G.992.2 Standards, and it is to be appreciated that other types of interleaving techniques may be used in other embodiments.

Next in the processing paths are the tone ordering units 26, 32, 28 that work in conjunction with bit loading algorithms. In one embodiment of the invention, the data tone ordering unit 26 is provided separately for data, the voice tone ordering unit 32 is provided separately for voice, etc. By providing separate tone ordering units, an embodiment of the invention allows bit loading that takes into account whether the information to be transmitted requires high/low bit rates and high/low error rates. For example, bits associated with voice can be loaded into or assigned to constellations having many points. Stated in another way, bits can be assigned to carriers (e.g., "tone-ordered") based on the number of bits that the particular carriers can support and based on the noise and/or error performance of those carriers.

Because voice transmission is more tolerant of errors, such constellations can permissibly produce relatively higher error rates, yet still provide sufficient quality and bit rates. Bits associated with data can be loaded into constellations having fewer points. Because data is less tolerant of errors, such constellations are the most practical because they produce lower error rates, yet still provide sufficient bit rates.

As another example, video transmission typically involves the sending of a "key" frame that serves as the "base" image. Updates to the key frame, to denote movement or other changes, involves the sending of "D" frames. Errors should be avoided in the key frame, but errors to the D frames can be tolerated since erroneous D frames can be discarded without significantly affecting picture quality. Therefore, an embodiment of the invention can tone order key frame data conservatively (e.g., use constellations having fewer points), and tone order D frame data aggressively (e.g., use constellations having many points). Stated in another way, key frame data and D frame data can be tone ordered in separate processing paths.

Various parameters and factors can be used by an embodiment of the invention when determining optimal tone ordering. Such parameters and factors include, but are not limited to, identification of carrier frequencies that are more/less susceptible to noise, identification of maximum bit loading limits of carrier frequencies, signal-to-noise (S/N) ratio or margin requirements of the information to be transmitted, which carrier frequencies are available for transmission, etc. As an example, if it is determined that the S/N margin needed for sufficient quality is 3 dB for voice and 10 dB for data, then the voice tone ordering unit 32 and the data tone ordering unit 26 can respectively choose constellations that satisfy these criteria.

As an example, if one embodiment of the transceiver 12 uses 256 channels or tones (255 carriers and one dc carrier), specific tones can be pre-allocated for voice, while other tones can be pre-allocated for data (e.g., tones 1–200 can be ordered for data and tones 201–255 can be ordered for voice—it is understood that these tone "numbers" are merely for reference and do not necessarily imply a sequential use/allocation of tones). In another embodiment, data can use the odd-numbered tones, and voice can use the even-numbered tones, for example. In yet another embodiment, the tone-ordering can be dynamic such that voice or data are assigned to constellations based on whether particular tones are available for use (e.g., is not pre-allocated or currently in use for other transmissions). In the embodiments above, selecting a particular constellation or tone order can ultimately depend on the type of signal quality and/or bit rate desired. Also, it is noted that in an embodiment, each of the tone ordering units 26, 32, 38 knows the tones the other tone ordering units are using. In this manner, the tone ordering units 26, 32, 38 work dependently on each other, based on a knowledge of the tones or carriers being used by the others.

Additional bit loading or tone ordering operations that are subsequently performed by the tone ordering units 32 and 26, after determination of the type of information to be transmitted and the transmission requirements for that type of information, can be based on known bit loading or tone ordering techniques, such as those described in the G.992.2 Standards.

The outputs of the tone ordering units 26, 32, 38 form input frames into a constellation encoder unit 40, at a reference point delineated as "C" in FIG. 1. According to an embodiment, the constellation encoder unit 40 comprises a multiple constellation encoder to correspondingly encode bits received from the separate processing paths. The constellation encoder unit 40 is used to construct the constellations or generate output signals, based on the bit loading and tone ordering performed by the tone ordering units 26, 32, 38, using suitable constellation encoding techniques, such as those described in the G.992.2 Standards.

In one embodiment, the constellation encoder unit 40 includes a gain scaling component. The gain scaling component applies gain increases/decreases $g_i$ to the tones to further improve performance. Gain scaling values for $g_i$, such as those described in the G.992.2 Standards may be used.

According to one embodiment, the constellation encoder unit 40 has $Z_i'=g_iZ_i$ number of output lines, where $Z_i$ is a vector defining each constellation point according to $Z_i=X_i+jY_i$. The value of i ranges between 1 and $N_{sc}-1$, where $N_{sc}$ is the number of subcarriers. In an embodiment, the spacing between subcarriers is 4.3125 kHz, with the subcarriers at f=n*4.3125 kHz, where n=1, 2, ..., $N_{sc}$.

As an example for a DMT implementation, an inverse discrete Fourier transform (IDFT) unit 42 performs modulation based on the $Z_i'$ outputs received from the constellation encoder unit 40. In one embodiment, an output sequence $x_n$ of the IDFT unit 42 can be generated using the IDFT transform:

$$x_n = \sum_{i=0}^{N_{IDFT}-1} \exp(j\pi K_i/N_{sc})Z_i''$$

where $N_{IDFT}$ denotes the number of output values of the IDFT unit 42, K is the number of bytes in a data frame, and $Z_i''=Z_i'$ for i=1 to $N_{sc}-1$.

The outputs of the IDFT unit 42 can be arranged in a cyclic prefix as shown in FIG. 1, and then input into an output serial/parallel buffer 44. The output(s) of the buffer 44 are then sent to a digital-to-analog converter (DAC) unit 46 for conversion and further processing, prior to being sent out to a receiver at the other end of the communication medium (e.g., copper twisted-pair connection).

Figure 2:
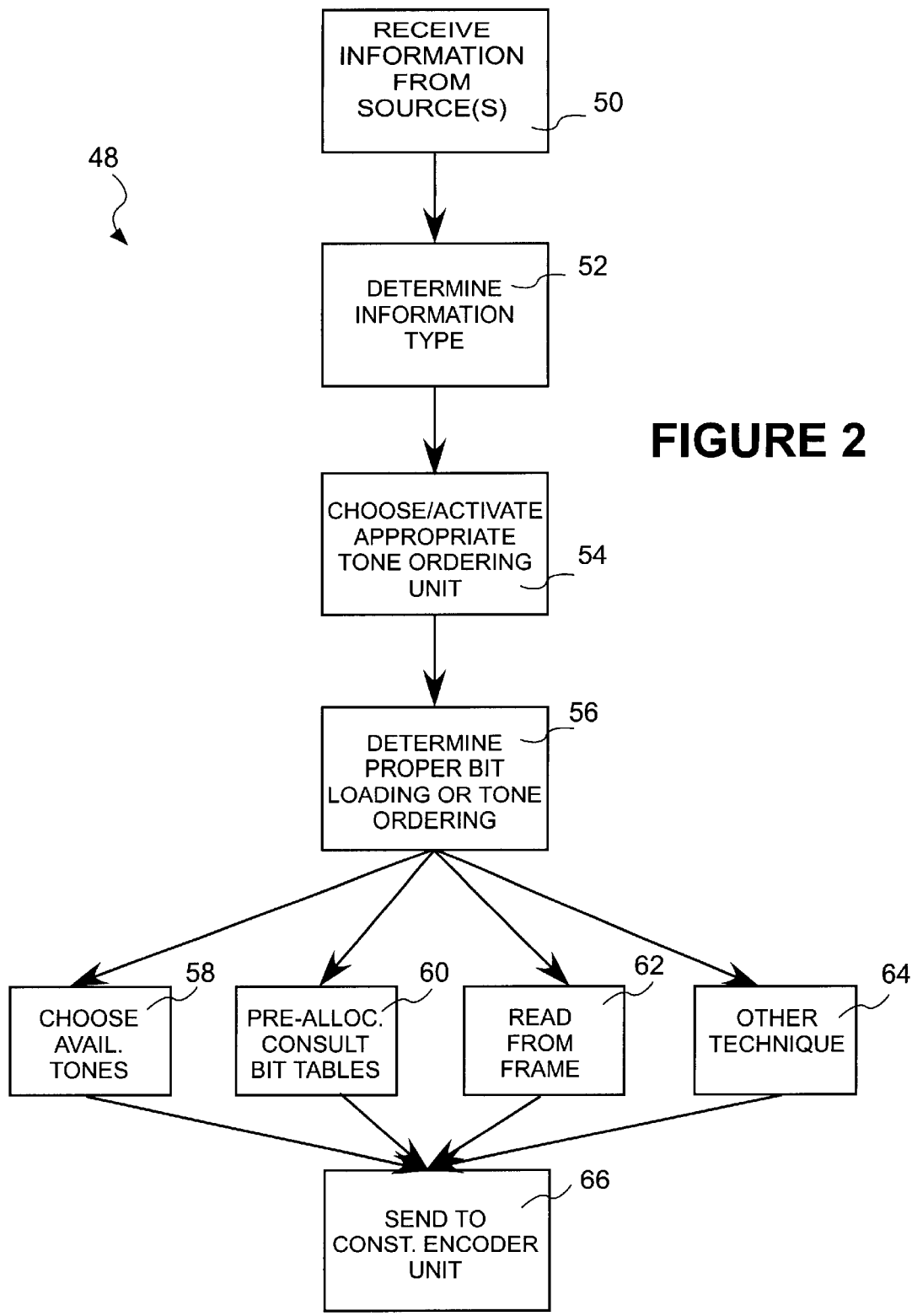
FIG. 2 is a flowchart depicting an embodiment of a bit loading or tone ordering algorithm that can be used by the transceiver of FIG. 1.

Shown next in FIG. 2 is a flowchart depicting an embodiment of a bit loading or tone ordering algorithm 48 that can be used by the system 10 of FIG. 1. The algorithm 48 can be embodied in software or other machine-readable instructions stored on a machine-readable medium. Some or all of the various operations depicted in the algorithm 48 can be performed separately for an individual one of the tone ordering units 26, 32, 38 in one embodiment, or can be performed for several of the tone ordering units 26, 32, 38 in another embodiment.

Beginning at a block 50, information is received from a source(s). In one embodiment, the received information is in the form of interleaved bits, and is received from one or more of the interleaver units 24, 30, 36. In embodiments where there are no interleaver unit(s) and/or scrambler and FEC unit(s) (or in embodiments where such units are turned off), the information received at the block 50 may be received from other source(s). The information is received by one or more of the tone ordering units 26, 32, 38 and can include information associated with data, voice, video, etc.

At a block 52, the algorithm 48 determines the type of the information received (e.g., determines whether the received information is voice, data, video, etc.). In an embodiment, the determination at the block 52 need not be performed if the tone ordering unit is assigned to a certain source and processes data it receives from that source. In another embodiment, this determination can be performed by monitoring the separate processing paths and noting which paths are actively receiving information from the interleaver unit (s). Because the processing paths are specifically dedicated to voice, data, video, etc., activity along any one of the paths indicates the type of information being sent. According to an embodiment, if multiple processing paths are active (e.g., voice and data are being simultaneously sent for transmission), the interleaved bits can be examined to determine the information type, by examining header or control information for example. It is also possible, again, to inherently determine the information type (or not have to determine it at all) by simply noting which dedicated processing paths are active.

At a block 54, the algorithm 48 activates or chooses an appropriate one or more of the tone ordering units 26, 32, 38 based on the determined information type. In an embodiment, the appropriate tone ordering unit is activated simply by virtue of being in the processing path in which information is propagating. In another embodiment, software of the algorithm 48 can selectively activate one or more of the tone ordering units 26, 32, 38 after determining the information type.

Once the appropriate one(s) of the tone ordering units 26, 32, 38 are activated at the block 54, proper bit loading or tone ordering (e.g., to optimize performance as previously described above) is determined at a block 56. Some techniques to determine proper bit loading or tone ordering are illustrated at blocks 58–64 in FIG. 2. At the block 58, tone ordering may be based on a choice of available tones, if certain tones are currently in use. At the block 60, the tones may be pre-allocated or pre-designated, and so bit tables that match tones according to number of bits, S/N ratios, information types, carrier noise, etc. may be used. At the block 62, the proper tone to use may be designated in the frame of the information to be transmitted, such as in the header or control portion of the frame. Other techniques previously described above or techniques other than those described herein may be used at the block 64. Furthermore, it is possible to combine some or all of the techniques shown in the blocks 58–64 to determine optimal bit loading.

After the bit loading or tone ordering is performed at the blocks 56–64, the information is sent to the constellation encoder unit 40 for further processing and eventual transmission over the communication medium.

Therefore, in conclusion, an embodiment of the invention provides a transceiver having separate bit loading and constellation encoding for each processing path. As such, voice, data, video, etc. can be processed and treated differently, in a manner such that bit loading or tone ordering takes into account the type of information to be transmitted. Information that can contain more errors are mapped into constellations having many points, while information that should have less errors are mapped into constellations having fewer points.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while an embodiment of the invention has been described herein in the context of a transmit mode of operation, it is to be appreciated that principles of the invention may be applied in the context of a receive mode of operation according to another embodiment. For a receiver, an analog-to-digital converter (ADC) unit 48 replaces the DAC unit 46. Output(s) of the ADC unit 48 are fed into an input serial/parallel buffer 50. The buffer 50 outputs the information for demodulation by a DFT unit 52, which then subsequently outputs to a constellation decoder 54. From the constellation decoder 54, the information is processed along separate processing paths 56, 58, and 60, for example, having a tone de-ordering unit 62, a de-interleaver unit (not shown), a de-scrambler unit (not shown), etc., until a representation of the originally transmitted information is finally obtained.

As another modification, it is to be appreciated that transceivers other than DMT-based ADSL transceivers may be used in one embodiment of the invention. Multi-carrier transceivers that are based on simultaneous use of multiple frequencies for transmission/reception, such as orthogonal frequency division multiplexing (OFDM) transceivers, may implement features of the various embodiments described herein. Implementation of an embodiment of the invention for DMT transceivers is described herein for the purpose of explanation and illustration.

Furthermore, while specific techniques and mathematical equations are used above to describe operation of various components of the processing paths (e.g., modulation by the IDFT unit 42, convolutional interleaving, Reed-Solomon encoding, etc.), it is understood that these techniques and equations are for illustrative purposes. Other embodiments may use different techniques or mathematical operations, such as the embodiments implemented in non-DMT multi-carrier transceivers.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a plurality of separate processing paths, each of the separate processing paths having a tone ordering unit coupled to receive information of a type different from information received by another processing path and to assign the received information to carrier channels designated for that information type based on use of a separate bit loading algorithm for each processing path; and
   a constellation encoder unit coupled to receive outputs of the tone ordering units and to generate signals corresponding to constellations representative of the carrier channels to which the received information are assigned.

2. The apparatus of claim 1 wherein the processing paths comprise a part of a discrete multi-tone (DMT) based asymmetric digital subscriber line (ADSL) transceiver.

3. The apparatus of claim 1 wherein types of information correspondingly received by the separate processing paths comprise voice information and data.

4. The apparatus of claim 3 wherein another one of the types of information received by one of the processing paths comprises video information.

5. The apparatus of claim 1 wherein each of the separate processing paths further includes:
   a scrambler and forward error correction (FEC) unit coupled to receive frames from an information source and to reorder bits of the received frames; and
   an interleaver unit coupled to the scrambler and FEC unit to convolutionally interleave portions of frames having reordered bits that are received from the scrambler and FEC unit, and to provide the convolutionally interleaved portions to the tone ordering unit in that processing path.

6. The apparatus of claim 1, further comprising:
   an inverse discrete Fourier transform (IDFT) unit coupled to receive the signals generated by the constellation encoder unit and to use the received signals to generate an output sequence representative of modulated carrier signals that correspond to the carrier channels;
   an output buffer coupled to the IDFT unit to store the output sequence representative of the modulated carrier signals; and
   a digital-to-analog converter to receive digital signals representative of the output sequence from the buffer and to convert the digital signals into analog signals to transmit over a communication medium.

7. The apparatus of claim 1 wherein the constellation encoder unit includes a gain scaling component to adjust a gain of the signals generated by the constellation encoder unit.

8. The apparatus of claim 1 wherein information received in at least one of the processing paths includes similar information types.

9. A system, comprising:
   a plurality of information sources, each information source generates information of a type different from information generated by another information source;
   a plurality of separate processing paths correspondingly coupled to the plurality of information sources, each of the separate processing paths having a tone ordering unit coupled to receive information sent by the information source that corresponds to that processing path and to assign the received information to carrier channels designated for the information type sent along that processing path based on use of a separate bit loading algorithm for each processing path; and
   a constellation encoder unit coupled to receive outputs of the tone ordering units and to generate signals corresponding to constellations representative of the carrier channels to which the received information are assigned.

10. The system of claim 9 wherein each of the separate processing paths further includes:
    a scrambler and forward error correction (FEC) unit coupled to receive frames from an information source and to reorder bits of the received frames; and
    an interleaver unit coupled to the scrambler and FEC unit to convolutionally interleave portions of frames having reordered bits that are received from the scrambler and FEC unit, and to provide the convolutionally interleaved portions to the tone ordering unit in that processing path.

11. The system of claim 9, further comprising:
    an inverse discrete Fourier transform (IDFT) unit coupled to receive the signals generated by the constellation encoder unit and to use the received signals to generate an output sequence representative of modulated carrier signals that correspond to the carrier channels;

an output buffer coupled to the IDFT unit to store the output sequence representative of the modulated carrier signals; and a digital-to-analog converter to receive digital signals representative of the output sequence from the buffer and to convert the digital signals into analog signals to transmit over a communication medium.

12. The system of claim 11, further comprising a receiver coupled to the communication medium, the receiver including:

an analog-to-digital converter to receive the analog signals sent from the digital-to-analog converter and to convert the received analog signals into digital signals representative of the output sequence;

an input buffer coupled to the analog-to-digital converter to store the digital signals; and a discrete Fourier transform (DFT) unit coupled to the input buffer to receive an input sequence representative of the stored digital signals and to demodulate the input sequence.

13. The system of claim 12 wherein the receiver further comprises:

a constellation decoder unit coupled to the DFT unit to receive the demodulated input sequence and to decode the demodulated input sequence; and a plurality of separate processing paths coupled to the DFT unit, one of the separate processing paths coupled to the DFT being designated for the information type corresponding to the decoded input sequence and having a tone de-ordering unit to process the decoded input sequence, each of the separate processing paths having a tone de-ordering unit corresponding to an information type designated for that processing path.

14. The system of claim 9 wherein at least one of the information sources is capable to provide similar information types.

15. A method, comprising:

designating a plurality of separate processing paths to each process information of a type different from information capable of being processed by another processing path;

for one of the separate processing paths, identifying carrier channels designated for the information type corresponding to information processed along that processing path based on use of a separate bit loading algorithm for each processing path; and generating signals corresponding to constellations representative of the identified carrier channels.

16. The method of claim 15 wherein identifying the carrier channels and generating signals corresponding to constellations are associated with a receive mode of operation.

17. The method of claim 15 wherein identifying the carrier channels and generating signals corresponding to constellations are associated with a transmit mode of operation.

18. The method of claim 15, further comprising:

generating an output sequence representative of modulated carrier signals that correspond to the identified carrier channels;

storing the output sequence representative of the modulated carrier signals; and converting digital signals derived from the output sequence into analog signals to transmit over a communication medium.

19. The method of claim 15, further comprising for each of the processing paths:

receiving frames from an information source and reordering bits of the received frames;

forward error correcting bits of the received frames; and convolutionally interleaving portions of frames having reordered bits and providing the convolutionally interleaved portions for subsequent identification to the carrier channels that are designated for the information type processed along that processing path.

20. The method of claim 15, further comprising adjusting a gain of the generated signals that correspond to the constellations representative of the identified carrier channels.

21. The method of claim 15, further comprising, for at least one of the processing paths, processing similar information types.

22. An article of manufacture, comprising:

a machine-readable medium having stored thereon instructions to:

determine a type of information received along separate processing paths, each of the separate processing paths corresponding to a different information type;

select a tone ordering unit in one of the separate processing paths that corresponds to the determined information type;

using the selected tone ordering unit, assign the received information to carrier channels designated for the determined information type based on use of a separate bit loading algorithm for each processing path.

23. The article of manufacture of claim 22 wherein the machine-readable medium further includes instructions to trigger generation of signals corresponding to constellations representative of the carrier channels to which the received information are assigned.

24. The article of manufacture of claim 22 wherein the instructions to assign the received information to carrier channels designated for the determined information type include instructions to use a bit table to match the carrier channels to the determined information type.

25. The article of manufacture of claim 22 wherein the instructions to assign the received information to carrier channels designated for the determined information type include instructions to assign the received information to available carrier channels.

26. The article of manufacture of claim 22 wherein the instructions to assign the received information to available carrier channels includes instructions to assign the received information to carrier channels currently unused by other ones of the separate processing paths.

27. The article of manufacture of claim 22 wherein the instructions to assign the received information to carrier channels designated for the determined information type include instructions to determine the carrier channels by reading header content of the received information.

28. The article of manufacture of claim 22 wherein the instructions to assign the received information to carrier channels designated for the determined information type include instructions to determine the carrier channels by examining signal-to-noise requirements and bit rate requirements of the received information.

29. The article of manufacture of claim 22 wherein at least one of the processing paths is capable to process similar information types received at that processing path.

* * * * *